Patented Apr. 3, 1934

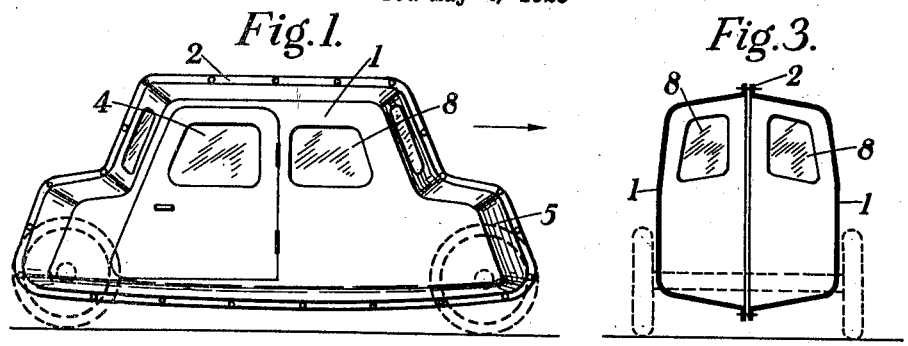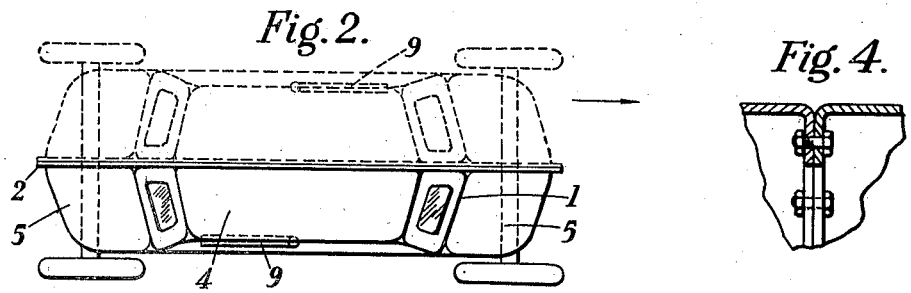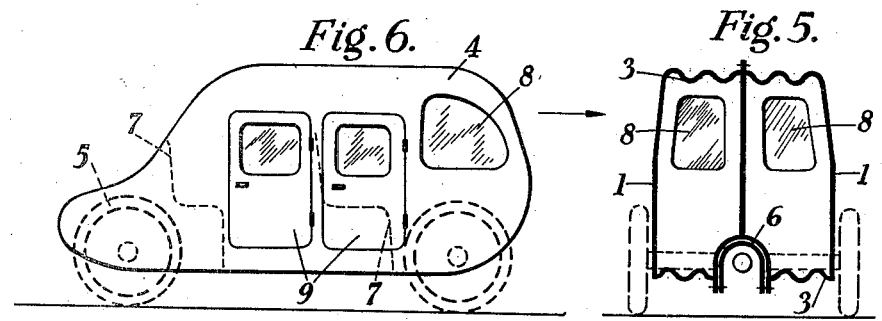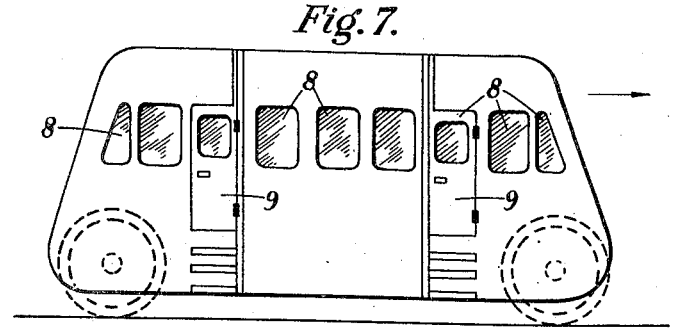

1,953,515

UNITED STATES PATENT OFFICE 1,953,515

MOTOR VEHICLE

Sydney Smith, Chobham, England

Application May 4, 1929, Serial No. 360,523
In Great Britain May 5, 1928

14 Claims. (Cl. 296—28)

The present invention relates to motor vehicles, with particular reference to those of the saloon or covered type, and has for its object to provide an improved general construction primarily intended for the production of small cars, giving amongst its many advantages lightness of weight with adequate strength, and low cost of production. The invention is, however, also applicable to the construction of large cars and even char-à-bancs of the saloon or covered type.

One important feature of the invention resides in eliminating the usual chassis frame by employing a body which is mounted upon the road wheels without the intermediary of a chassis frame and supplies the necessary rigidity to the vehicle usually provided by the chassis frame. To this end the body consists of a closed box or shell made solely of thin sheet metal in such manner that the side walls are made continuous with the top, bottom and end walls, whereby the use of internal frame members to join said walls together is eliminated.

The term "box-like" is intended to cover forms other than those purely or mainly rectangular. For example, a rounded or ovoid shape or outline may prove desirable. As will be appreciated, such a construction necessarily implies the production of a motor vehicle of the saloon, fixed coupé type, or other covered type.

In connection with the foregoing it should be appreciated that one of the main features of the invention consists in making use of the weather proof covering of the vehicle to give the necessary rigidity to the vehicle as a whole, which rigidity is usually given by the chassis frame. According to existing motor car practice, the vehicle comprises two entirely separate parts, viz. the chassis frame and the body. The frame carries the engine and other driving mechanism, being supported by the road wheels, and gives the necessary longitudinal and lateral rigidity to the vehicle. The body, which merely serves as a weather covering for the passengers, is built or rests upon, and is carried along by the frame. Thus, in existing motor car practice, the chassis may really be regarded as the entire vehicle, and the body as merely a load placed upon the vehicle.

In the case of the present invention the weather proof body itself constitutes the entire frame of the vehicle. It may be built up of any suitable weather proof material, but preferably it is made up of two stampings or pressings of metal, ply wood, or other suitable material, which are bolted, riveted, or welded together along the longitudinal centre line of the vehicle. These pressings or stampings may be made identical, i. e. made by the same dies, one being longitudinally reversed in relation to the other when their edges are secured together. Alternatively, each half of the body may in turn be divided transversely to the length of the vehicle, into two sections, so that the body becomes built up of four quarter sections, or into three or more sections.

A further important object of the invention is to provide a motor vehicle having a very low pitched body with a minimum of ground clearance, thereby increasing the safety, due to the lowering of the centre of gravity, and decreasing windage, resulting in increased speed and lower running costs. This object is accomplished by so mounting the body on the wheels that the wheel axles are at the sides of the body, instead of beneath it as is the usual practice, whereby the bottom of the body is brought below the level of the wheel axles.

The engine is preferably located in immediate proximity to the driving wheels of the vehicle, so that all longitudinal transmission mechanism is eliminated. Thus, in the case of a rear wheel drive, the engine would be located at the rear end of the vehicle, although controlled from the usual driver's steering seat in front. Preferably, however, a front wheel drive is made use of, the engine being carried by the wheel axle and driving the front wheels through universally jointed shafts projecting outwardly from the engine and gear casing. The two rear wheels would then be independently carried by arms or brackets extending directly from the tail end of the body, with the consequent elimination of a cross tree or axle. With this construction if the engine is located outside the body, it becomes in effect a tractor, for which the vehicle itself acts as a trailer. Also, stresses on the body are reduced by the independent mounting of the two rear wheels.

In order that the invention may be clearly understood and readily carried into practice, I have appended hereto one sheet of drawings, diagrammatically illustrating the same, but it should be clearly understood that such drawing is only given by way of example and is not to be regarded as restrictive of the scope of the claims appended hereto and forming part of this specification.

In the drawing:—

Figure 1 is a side elevation illustrating one form of vehicle body according to the invention, Figure 2 is a plan view illustrating the building of the body from two identical longitudinal sections, Figure 3 is a cross section of the body built up of two such sections, Figure 4 illustrates a detail modi1cation, Figure 5 is a cross sectional view illustrating modifications, Figure 6 is a side elevation illustrating another form of body, and Figure 7 is a side elevation illustrating a char-à-bancs body according to the invention.

In carrying the invention into practice, the body may be made of steel or other suitable metal which is die pressed, and it would be slung lower in relation to the ground than bodies at present in use. Its platform or floor is below the level of the wheel axles, which project at the sides of the body, and in fact, preferably comes as low as the usual running boards, which may be dispensed with, and there would, of course, be no parts projecting below the bottom of the body. The low position of the body will, of course, give increased stability, and would be determined by the necessary ground clearance.

The height of the body may vary along its length so as to produce, say, a central chamber of a height to suit passengers, and forward and/or rear parts of less height, to serve for the reception of the engine and as baggage or storage space. The engine may be disposed either outside the body or within the body, but in any case it is preferably mounted quite free of the body so that no engine vibration can be transmitted to the body. In the case of the engine being located outside the body, it would be enclosed in a separate covering or casing.

The body may, for example, be made up, as illustrated by Figures 1, 2 and 3, of two pressings fastened together along the vertical longitudinal centre plane X—X of the vehicle, by means of peripheral flanges 2 projecting either inwardly, as illustrated by Figure 4, or outwardly, as in Figures 1, 2 and 3, and fastened together by suitable bolts or rivets, or by welding. The floor of the body, as also the roof, may be longitudinally rolled into corrugations 3 to give greater strength, as illustrated by Figure 5. The material of which the body is made may be finished both internally and externally by dipping in enamel or paint, and the interior decoration may be completed by upholstery suitably hung from wooden frames.

The vehicle is shown as made of similar shape at its opposite ends, so that the pressing forming one half may equally well be used for the other half by turning it round endwise, as apparent from Figure 2. Thus, a single set of dies can be used for the complete formation of the floor, roof, and sides of the body.

In the shape illustrated by Figures 1, 2 and 3, the body comprises a centrally disposed saloon 4, the ends of which are inclined to an apex or are V shaped, and beyond said ends project portions 5 of lower height, one of which may serve as the engine and steering gear space, and the other of which may serve for the storage of baggage. Said end portions 5 have a floor, side and roof, continuous with that of the saloon part 4 of the body, and preferably decrease both in width and height according to the prevailing fashionable shapes. For example, they may decrease both in width and height towards the ends of the vehicle, at which they are smoothly rounded, so that the vehicle is more or less in the shape of a boat having a prow at both ends and a raised cabin amidship.

Figure 5 illustrates, in addition to the floor and roof corrugations 3, the provision of a sheet metal tunnel 6 within the body for the Cardan shaft, should the engine be at the opposite end of the vehicle from the driven road wheels. By this means the floor of the vehicle may still be kept close to the ground, all the mechanism being kept above the floor level.

Figure 6 illustrates another form of body which is more or less of stream line shape, the seating positions being indicated by the dotted lines 7. With this construction, of course, the two ends of the vehicle are different, and therefore it will be necessary if the body is to be built up of two pressed sheet metal halves, to make two different pressings of left and right handed characteristics, involving two different sets of dies.

Figure 7 illustrates a char-à-bancs body constructed according to the invention of more or less simple box form, although obviously it could be made as an elongated form of any of the shapes previously illustrated.

It should be clearly understood that each longitudinal half of the body may be built up of several sections riveted or welded together. For example, in the case of Figures 1 to 3, each longitudinal half section might be divided vertically and transversely of the vehicle into two parts, so that the body becomes built up of four quarter sections. In the case of a char-à-bancs, or the like elongated vehicle, the body is built up of two longitudinal halves which may be divided into a series of three or more transverse sections, as illustrated by Figure 6, these being riveted, welded, or otherwise fastened together in parallel vertical planes.

Alternately to dividing the halves of the body vertically and transversely into sections, they may be divided longitudinally along horizontal planes, so that each half of the body is built up of a number of superposed horizontal sections.

The interior of the body is locally strengthened or stiffened where required by steel or other rods, bars or plates.

The saloon part 4 of the body would, of course, be provided with windows 8 and doors 9 for which suitable openings would be left in the construction of the body. Also, if desired, a portion of the roof of the body may be made slidable to admit sun and air into the body when desired. At the points of attachment of the wheels or at any points required to bear any special load, the wall of the body may be strengthened by a series of plates of decreasing size secured one upon another, and to the wall of the vehicle, so that the load is distributed instead of being localized on the comparatively frail wall of the vehicle.

It should be understood that the body is not mounted directly on the wheel axles, but is connected therewith through a suitable springing system, without, of course, the intermediary of a chassis frame.

What I claim is:—

1. A motor vehicle of the saloon type including a box like body divided in a longitudinal central vertical plane into two half bodies which are made solely of thin sheet metal and are secured together at their edges in the said vertical plane, each side wall of the body constituting a connection between corresponding longitudinal halves of the roof and bottom of the body, said body being mounted upon road wheels with its bottom wall below the level of the wheel axles.

2. A motor vehicle of the saloon type including a totally enclosed body built up by securing together in a vertical plane two longitudinal half bodies made solely of thin sheet metal, the walls of said half bodies being provided with any necessary door and window openings, and the body being mounted upon the road wheels without the aid of a chassis frame and with its bottom wall below the level of the wheel axles.

3. A motor vehicle of the saloon type including a thin sheet metal body of box like form mounted upon the road wheels without a chassis frame, and with its bottom wall below the level of the wheel axles, said body being divided in a vertical plane into two longitudinal half bodies which are identical with each other and may be pressed by the same dies.

4. A motor vehicle of the saloon type including a totally enclosed body comprising a pair of dished shell members each consisting of a base having a flange extending continuously and completely therearound, the shell members being disposed with their bases vertical and spaced apart to form the longitudinal side walls of the body whilst each flange contributes to the formation of the front and rear ends, roof and bottom of the body, such body being free from internal ribs, having its side walls provided with door and window openings, and being mounted upon road wheels by means passing through the body without the aid of a chassis frame and with its bottom below the level of the association of the wheels with the said body.

5. A closed saloon and chassisless or girderless motor vehicle having a roof and floor structure permanently associated with the side and end walls and comprising a pair of opposed shells each shell having a base disposed substantially vertically and constituting a longitudinal side of the body, and each shell also including a peripheral flange around said base and projecting transversely outwardly therefrom, each of said shells having the free edge of its flange disposed in a vertical plane and the shells being connected, with the substantially vertical walls spaced apart, to form a hollow box like body, said shells being formed solely of relatively thin sheet metal, and said body being mounted on road wheels which have association with the body in a higher plane than the bottom wall of the body, and the shells taking the whole load applied to the body and the top and bot'om walls of the shells being adapted themselves to form directly the roof and floor of the body and the latter being free from internal projections and of varying depth between its front and rear ends.

6. A frameless motor vehicle of the saloon type having a body shell including a pair of opposed shell metal pressings of channel section, arranged with their edges each in a longitudinal vertical plane, the bases of said pressings forming the longitudinal side walls of the body, said side walls being of a variable depth having a maximum value in the transverse central vertical plane of the body, said pressings being provided at their edges with integral outwardly extending flanges, and means for connecting said flanges together to provide a body shell of hollow box-like form, said pressings being of a comparatively small thickness but having sufficient strength to provide in the vehicle the necessary longitudinal and lateral rigidity.

7. A frameless motor vehicle of the saloon type, including a body shell comprising a pair of opposed sheet metal pressings of identical shape but of opposite hand, said pressings being of dished form and arranged with their edges each in a longitudinal vertical plane, and provided at said edges with integral outwardly extending flanges, and means for connecting said flanges together to provide a body shell free from internal projections, said pressings being of a comparatively small thickness but having sufficient strength to provide in the vehicle the necessary longitudinal and lateral rigidity.

8. A frameless motor vehicle of the saloon type, including a totally enclosed hollow body, comprising a pair of half bodies joined together in a central longitudinal vertical plane, each half body being formed as a sheet metal pressing, the side walls of said half bodies having a variable depth of maximum value substantially midway between the positions of the front and rear wheel axles and of substantially less value over a distance at the front portion of the body and means for connecting said pressings together to provide a body shell substantially free from internal projections, said pressings being of a comparatively small thickness but having sufficient strength to provide in the vehicle the necessary longitudinal and lateral rigidity.

9. A motor vehicle of the saloon type, including a pair of axles supporting a totally enclosed combined body and chassis, said body comprising a pair of box like pressings of identical shape but of opposite hand and having their edges connected together, the body having a middle portion between the axles of maximum depth whereby the required strength and space for the occupants are obtained between the supports and having an end portion which is of substantially less depth than the rest of the body to provide a cowl of conventional form.

10. A frameless motor vehicle of the saloon type including a totally enclosed body comprising a pair of dished shell members each consisting of a base having a flange extending continuously and completely therearound, the shell members being disposed with their bases vertical and spaced apart to form the longitudinal side walls of the body, the flanges being provided at their edges with integral outwardly extending continuous edge-flanges, and said edge-flanges being connected together in a vertical plane disposed longitudinally to the body.

11. A frameless saloon motor vehicle having a body comprising a pair of opposed sheet metal pressings of identical shape but of opposite hand, said pressings being of dished form and arranged with the edges each in a longitudinal vertical plane, and provided at said edges with integral out-turned edge-flanges, said shells being connected together by means of said out-turned edge-flanges to form a body of conventional saloon form and free from internal projections, and such body being associated with road wheels without an intermediate chassis frame.

12. A frameless motor vehicle of the saloon type including a totally enclosed body comprising a pair of dished shell members each consisting of a base having a flange extending continuously and completely therearound, the shell members being disposed with their bases vertical and spaced apart to form the longitudinal side walls of the body, said flanges being each provided at their edges with an integral outwardly extending continuous edge-flange, and means for connecting said edge-flanges together to provide a body shell of hollow box like form, said pressings being of a comparatively small thickness but having sufficient strength to provide in the vehicle the necessary longitudinal and lateral rigidity, and means passing through said shell for mounting said body on the road wheels.

13. A frameless motor vehicle of the saloon type, including a permanently enclosed hollow body comprising a pair of half bodies each formed as a sheet metal pressing of dished form comprising a base having a peripheral flange projecting transversely outwardly therefrom, said pressings being arranged with their bases vertical and spaced apart to form the longitudinal side walls of the body, the flanges of said pressings being disposed substantially horizontal with their free edges joined together in a central longitudinal vertical plane to form a hollow box like structure, said flanges being all of substantially the same thickness to provide for the body a roof and floor having substantially the same effective transverse area of cross-section, and said body being mounted on road wheels which are associated with the body in two spaced transverse planes.

14. A motor vehicle of the saloon type including a totally enclosed body comprising a pair of dished shell members, each consisting of a base having a flange extending continuously and completely therearound, the shell members being disposed with their bases vertical and spaced apart to form the longitudinal side walls of the body whilst each flange contributes to the formation of the front and rear ends, roof and bottom of the body, those flanges forming the front and rear ends of the body being inclined outwardly from the interior thereof and disposed obliquely to the planes of the longitudinal side walls of the body and means for supporting said body on the road wheels, said shell members being adapted to transmit the weight of the body to said supporting means at positions disposed on the longitudinal side walls of the body.

SYDNEY SMITH.